United States Patent [19]

Mulaskey

[11] 4,309,275

[45] Jan. 5, 1982

[54] HYDROCARBON CONVERSION WITH CRYSTALLINE SILICATES TO PRODUCE OLEFINS

[75] Inventor: Bernard F. Mulaskey, San Rafael, Calif.

[73] Assignee: Chevron Research Company, San Francisco, Calif.

[21] Appl. No.: 144,473

[22] Filed: Apr. 28, 1980

[51] Int. Cl.³ .................... C10G 11/02; C10G 47/02
[52] U.S. Cl. .................... 208/109; 208/118; 208/120; 208/134; 252/455 R; 252/455 Z; 423/335; 585/648; 585/654
[58] Field of Search ............... 208/113–120, 208/134, 109; 585/648–663

[56] References Cited

U.S. PATENT DOCUMENTS

| | | | |
|---|---|---|---|
| 2,326,703 | 8/1943 | Thiele et al. | 208/134 X |
| 3,700,585 | 10/1972 | Chen et al. | 208/111 |
| 3,941,871 | 3/1976 | Dwyer et al. | 423/326 |
| 4,061,724 | 12/1977 | Grose et al. | 423/335 |
| 4,073,865 | 2/1978 | Flanigen et al. | 423/335 X |
| 4,171,257 | 10/1979 | O'Rear et al. | 208/120 |
| 4,238,318 | 12/1980 | Kouwenhoven et al. | 208/120 |

OTHER PUBLICATIONS

"Silicalite, A New Hydrophobic Crystalline Silica Molecular Sieve", Flanigen et al. Nature 271, 512–516, 2-9-78.

"Silicalite-2, A Silica Analogue of the Aluminosilicate Zeolite ZSM-11, Bibby et al., Nature 280, 664–665, 8-23-79.

"Pentasil Family of High-Silica Crystalline Materials", Kokotailo et al., Proceedings of a Conference, pp. 133–139, Apr. 18-20, '79.

"Chemical and Physical Properties of the ZSM-5 Substitutional Series", Olsen et al., Journal of Catalysis 61, 390-396 (1980).

*Primary Examiner*—Delbert E. Gantz
*Assistant Examiner*—G. E. Schmitkons
*Attorney, Agent, or Firm*—D. A. Newell; S. R. LaPaglia; W. L. Stumpf

[57] ABSTRACT

A process for selectively converting adsorbable hydrocarbon feeds containing straight-chain and slightly branched-chain hydrocarbons to olefins by contacting the feeds with crystalline silicates.

10 Claims, 1 Drawing Figure

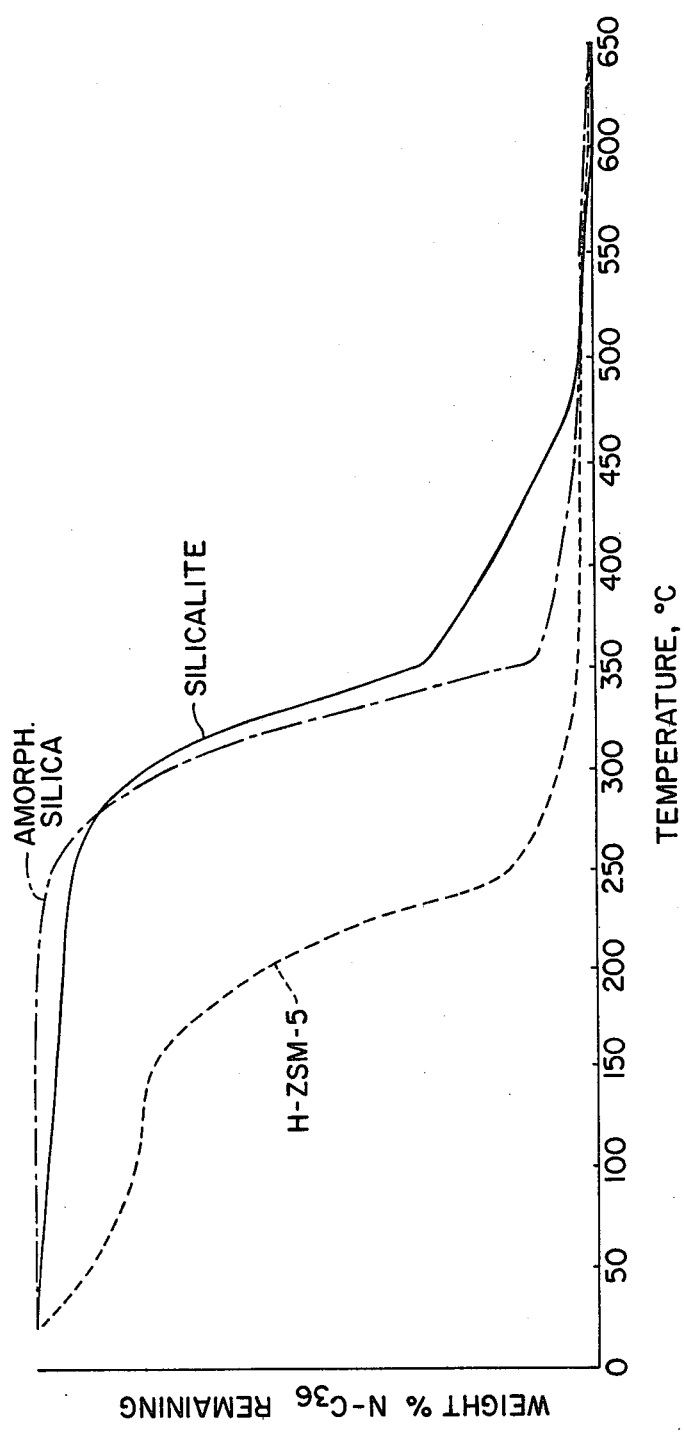

HYDROCARBON CONVERSION WITH CRYSTALLINE SILICATES TO PRODUCE OLEFINS

TECHNICAL FIELD

This invention relates to a process for hydrocarbon conversion, and particularly to processes for lowering the pour point of hydrocarbon oils and increasing the octane number of naphtha boiling range hydrocarbons, using crystalline silicates such as silicalite. In practicing the invention, normal and slightly branched paraffins are selectively converted into a lower molecular weight product mixture containing a significant amount of olefins.

Paraffins are normal components of both natural and synthetic hydrocarbons. The presence of these components is often undesirable. For example, paraffinic waxes impart a high pour point to the high-boiling oil fractions which contain them. Even in lower-boiling hydrocarbon fractions such as naphthas and motor gasolines, the presence of normal and slightly branched paraffins may be undesirable in that they tend to reduce significantly the octane number of the gasoline fraction. Procedures known in the art for removing these undesirable paraffins and paraffinic waxes include both physical dewaxing processes, including solvent dewaxing, and catalytic dewaxing processes.

Although catalytic dewaxing processes using crystalline zeolites have been reported in the literature, the dewaxing usually produces only light paraffinic gases which are not particularly reactive and so are burned or used as LPG fuels, e.g., U.S. Pat. No. Re. 28,398, Chen et al., Apr. 22, 1975 (dewaxing using ZSM-5-type zeolites). Other processes do produce chemically more useful compounds such as olefins, but require lower pressures to prevent hydrogenation of the olefins produced, e.g., U.S. Pat. No. 4,171,257, O'Rear et al., Oct. 16, 1979 (production of olefins by dewaxing with H-ZSM-5 at low pressures).

It can be appreciated that there is a continuing search for more efficient paraffin removal and dewaxing processes which can be used over wide temperature and pressure ranges, especially for those which produce chemically valuable olefins rather than the less useful light paraffinic gases.

The present invention is such a process. I have discovered that the normal and slightly branched paraffins present in hydrocarbon feeds can be selectively converted using crystalline silicates, and that large amounts of olefins can be produced from them. Most surprisingly, substantial quantities of olefins are produced, even at high pressures and in the presence of hydrogen.

BACKGROUND ART

Crystalline silicates have been prepared and reported in the literature. U.S. Pat. No. 4,073,865, Flanigen et al., Feb. 14, 1978, incorporated herein by reference, disclose crystalline silica polymorphs and their method of preparation. U.S. Pat. No. 4,061,724, Grose et al., Dec. 6, 1977, incorporated herein by reference, discloses a crystalline silica polymorph called "silicalite" and a method of preparation. U.S. Pat. No. Re. 29, 948, Dwyer et al., Mar. 27, 1979, incorporated herein by reference, discloses a crystalline silicate essentially free of Group IIIA metals, a method for preparing the silicate, and processes using the silicate.

Flanigen et al., Nature, 271, 512–516 (Feb. 9, 1978) discuss the physical and adsorption characteristics of silicalite. Bibby, et al., Nature, 280, 664–665(Aug. 23, 1979) report the preparation of a crystalline silicate called "silicalite-2".

Anderson et al., J. Catalysis, 58, 114–130 (199) discuss catalytic reactions and sorption measurements carried out on ZSM-5 and silicalite. Benesi, et al., in Adv. in Catalysis, Vol. 27, pp. 120–123 (1978) review the acidity and catalytic activity of silica gel. West, et al., J. Catalysis 29, 486–493 (1973) discuss the catalytic activity of silica gel.

DESCRIPTION OF THE DRAWING

The drawing illustrates the different activity of ZSM-5, silicalite, and silica gel on the catalytic conversion of n-$C_{36}$ paraffins.

TECHNICAL DISCLOSURE

The discovery of the present invention is embodied in process for producing olefins from normal paraffins, slightly branched paraffins, and mixtures thereof, comprising a feed which comprises said paraffins with a crystalline silicate, and producing an effluent of greater olefin content than said feed.

The discovery of the present invention is also embodied in a process for producing olefins from normal paraffins, slightly branched paraffins, and mixtures thereof, comprising a feed which comprises said paraffins with a composition substantially free of hydrogenation activity comprising silicalite composited in a matrix which is substantially free of cracking activity, said contacting occurring at temperatures from about 285° to about 595° C., pressures from about 14 to about 205 bar, liquid hourly space velocities from about 0.1 to 50 v/v/hr, and hydrogen to hydrocarbon volume ratios from about 350 to about 3650 liters hydrogen/liter hydrocarbon; and producing an effluent of greater olefin content than said feed, wherein said olefin content is at least 10 weight percent of converted feed.

The hydrocarbon feed used in the present invention may be any normally liquid hydrocarbon material, for example, naphtha, reformate, kerosene, diesel fuel, heating fuel, jet fuel, gas oil and lube oil stocks. Those hydrocarbon feeds boiling in excess of 200° C. are particularly suitable for use since they are typically dewaxed during processing to produce lube oils and mid-distillate fuels.

Preferably, the feed contains at least 5 weight percent normal and slightly branched paraffins, e.g.; from 5 to 40 weight percent, and more preferably at least 10 weight percent normal and slightly branched paraffins, e.g., from 10 to 30 weight percent.

If sulfur compounds are present in the feed, sulfur can react with the olefins produced to yield mercaptans. To lessen the possibility of the mercaptan producing reaction taking place, the feed can be lightly hydrotreated to less than 100 parts per million by weight organic sulfur, and preferably to less than 50 parts per million by weight organic sulfur. The presence of organonitrogen compounds has not been found to be detrimental to the present process; thus, the feed may contain any level of nitrogen such as 300 or 500 ppm or more. Even so, it is preferred that the level of organonitrogen compounds be less than about 25 and more preferably less than about 10 ppm by weight.

The feed is contacted with the crystalline silicate at standard cracking conditions including an elevated temperature, usually from about 290° C. to about 595° C., and more preferably from about 340° C. to about 480° C.; a pressure from subatmospheric to about 205 bar or more, preferably from atmospheric to about 140 bar, and more preferably from atmospheric to about 35 bar; and a liquid hourly space velocity of from about 0.1 to about 50 v/v/hr, preferably from about 0.5 to about 25 v/v/hr, and more preferably from about 1 to about 10 v/v/hr.

If desired, the process of the present invention can be carried out in the presence of hydrogen or added hydrogen at a system pressure up to 205 bar and preferably from 14 to 205 bar. The hydrogen may be dissolved in the feed or it may be present as a gas at partial pressures up to about 100 bar or more, or at hydrogen to hydrocarbon volume ratios from 350 to 3650 liters of hydrogen per liter of liquid hydrocarbon feed. Most surprisingly, significant amounts of olefins are formed even in the presence of hydrogen at pressures under which olefins would normally be hydrogenated, even in the absence of a specific metal hydrogenation catalyst. This unusual benefit from the use of the crystalline silicates allows the refinery to dispense with a low pressure reactor for olefin production in its process scheme. Through use of this process, olefins can be obtained without stepping-down then stepping-up pressure, and, without separating hydrogen from the process stream.

Regardless of whether hydrogen is present, the following general relationship may be observed in the contacting zone: the higher the molecular weight of the paraffins in the feed, the lower the temperature and pressure need be for satisfactory conversion and olefin production.

"Crystalline silicate" as used herein refers to silicates having rigid, three-dimensional network of $SiO_4$ tetrahedra in which the tetrahedra are crosslinked by the sharing of oxygen atoms. The crystalline silicates are substantially free of alumina, but they may contain minor amounts of alumina resulting from impurities in the starting materials or contamination of the reaction vessels. The silica/alumina mol ratio of the crystalline silicates is typically greater than about 200:1, preferably greater than about 500:1 and most preferably greater than about 1000:1. The crystalline silicates also have specific gravities, in the calcined form, of from about 1.50 to about 2.10 g/cc and a refractive index of about 1.3 to about 1.5.

As noted above, crystalline silicates which can be used in the process of the present invention have been reported in the literature. Silicalite (U.S. Pat. No. 4,061,724) has, as synthesized, a specific gravity at 25° C. of 1.99±0.05 g/cc as measured by water displacement. In the calcined form (600° C. in air for one hour), silicalite has a specific gravity of 1.70±0.05 gcc. With respect to the mean refractive index of silicalite crystals, values obtained by measurement of the as synthesized form and the calcined form (600° C. in air for one hour) are, respectively, 1.48±0.01 and 1.39±0.01.

The X-ray powder diffraction pattern of silicalite (600° C. calcination in air for one hour) has as its six strongest lines (i.e., interplanar spacings) those set forth in Table A ("S"—strong, and "VS"—very strong):

TABLE A

| d-A | Relative Intensity |
|---|---|
| 11.1 ± 0.2 | vs |
| 10.0 ± 0.2 | vs |
| 3.85 ± 0.07 | vs |

TABLE A-continued

| d-A | Relative Intensity |
|---|---|
| 3.82 ± 0.07 | s |
| 3.76 ± 0.05 | s |
| 3.72 ± 0.05 | s |

Table B shows the X-ray powder diffraction pattern of a typical silicalite composition containing 51.9 mols of $SiO_2$ per mol of $(TPA)_2O$, prepared according to the method of U.S. Pat. No. 4,061,724, and calcined in air at 600° C. for one hour.

TABLE B

| d-A | Relative Intensity | d-A | Relative Intensity |
|---|---|---|---|
| 11.1 | 100 | 4.35 | 5 |
| 10.02 | 64 | 4.25 | 7 |
| 9.73 | 16 | 4.08 | 3 |
| 8.99 | 1 | 4.00 | 3 |
| 8.04 | 0.5 | 3.85 | 59 |
| 7.42 | 1 | 3.82 | 32 |
| 7.06 | 0.5 | 3.74 | 24 |
| 6.68 | 5 | 3.71 | 27 |
| 6.35 | 9 | 3.64 | 12 |
| 5.98 | 14 | 3.59 | 0.5 |
| 5.70 | 7 | 3.48 | 3 |
| 5.57 | 8 | 3.44 | 5 |
| 5.36 | 2 | 3.34 | 11 |
| 5.11 | 2 | 3.30 | 7 |
| 5.01 | 4 | 3.25 | 3 |
| 4.98 | 5 | 3.17 | 0.5 |
| 4.86 | 0.5 | 3.13 | 0.5 |
| 4.60 | 3 | 3.05 | 5 |
| 4.44 | 0.5 | 2.98 | 10 |

Crystals of silicalite in both the as synthesized and calcined form are orthothombic and have the following unit cell parameters: a=20.05 A, b=19.86 A, c=13.36 A (all values±0.1 A).

The pore diameter of silicalite is about 6 Angstroms and its pore volume is 0.18 cc/gram as determined by adsorption. Silicalite adsorbs neopentane (6.2 A kinetic diameter) slowly at ambient room temperature. The uniform pore structure imparts size-selective molecular sieve properties to the composition, and the pore size permits separation of p-xylene from o-xylene, m-xylene and ethylbenzene as well as separations of compounds having quaternary carbon atoms from those having carbon-to-carbon linkages of lower value (e.g. normal and slightly branched paraffins).

The crystalline silicates of U.S. Pat. No. Re. 29,948 are disclosed as having a composition, in the anhydrous state:

$$0.9 \pm 0.2 \, [xR_2O + (1 - x) \, M_{2/n}O]: <.005 \, Al_2O_3:>1 \, SiO_2$$

where M is a metal, other than a metal of Group IIIA, n is the valence of said metal, R is an alkyl ammonium radical and x is a number greater than 0 but not exceeding 1. The organosilicate is characterized by the X-ray diffraction pattern of Table C.

TABLE C

| Interplanar Spacing d(A): | Relative Intensity |
|---|---|
| 11.1 | s |
| 10.0 | s |
| 7.4 | w |
| 7.1 | w |
| 6.3 | w |
| 6.4 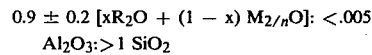 | w |

TABLE C-continued

| Interplanar Spacing d(A): | Relative Intensity |
|---|---|
| 5.97 | |
| 5.56 | w |
| 5.01 | w |
| 4.60 | w |
| 4.25 | w |
| 3.85 | vs |
| 3.71 | s |
| 3.04 | w |
| 2.99 | w |
| 2.94 | w |

The crystalline silicate polymorph of U.S. Pat. No. 4,073,865 is disclosed as having a specific gravity of 1.70±0.05 g/cc. and a mean refractive index of 1.39±0.01 after calcination in air at 600° C., as prepared by a hydrothermal process in which fluoride anions are included in the reaction mixture. The crystals, which can be as large as 200 microns, exhibit a substantial absence of infrared adsorption in the hydroxyl-stretching region and also exhibit an exceptional degree of hydrophobicity. They exhibit the X-ray diffraction pattern of Table D.

TABLE D

| d(A) | Intensity |
|---|---|
| 11.14 | 91 |
| 10.01 | 100 |
| 9.75 | 17 |
| 8.99 | 1 |
| 8.04 | 0.5 |
| 7.44 | 0.5 |
| 7.08 | 0.2 |
| 6.69 | 4 |
| 6.36 | 6 |
| 5.99 | 10 |
| 5.71 | 5 |
| 5.57 | 5 |
| 5.37 | 1 |
| 5.33 | 1 |
| 5.21 | 0.3 |
| 5.12 | 1.5 |
| 5.02 | 3 |
| 4.97 | 6 |
| 4.92 | 0.6 |
| 4.72 | 0.5 |
| 4.62 | 2 |
| 4.47 | 0.6 |
| 4.36 | 3 |
| 4.25 | 4 |
| 4.13 | 0.5 |
| 4.08 | 1.5 |
| 4.00 | 3 |
| 3.85 | 44 |
| 3.82 | 25 |
| 3.71 | 21 |
| 3.65 | 5 |
| 3.62 | 5 |
| 3.59 | 1 |
| 3.48 | 1.5 |
| 3.45 | 3 |
| 3.44 | 3 |
| 3.35 | 3 |
| 3.31 | 5 |
| 3.25 | 1.5 |
| 3.23 | 0.8 |
| 3.22 | 0.5 |

The literature describes the following method for the preparation of the crystalline silicate called "silicalite-2" (Nature, August, 1979):

The silicalite-2 precursor is prepared using tetra-n-butylammonium hydroxide only, although adding ammonium hydroxide or hydrazine hydrate as a source of extra hydroxyl ions increases the reaction rate considerably. A successful preparation is to mix 8.5 mol $SiO_2$ as silicic acid (74% $SiO_2$), 1.0 mol tetra-n-butylammonium hydroxide, 3.0 mol $NH_4OH$ and 100 mol water in a steel bomb and heat at 170° C. for 3 days. The precursor crystals are ovate in shape, approximately 2-3 micromillimeters long and 1-1.5 micromillimeters in diameter. The silicalite-2 precursor is reported as not forming if Li, Na, K, Rb or Cs ions are present, in which case the precursor of the U.S. Pat. No. 4,061,724 silicalite is formed. The size of the tetralkylammonium ion is reported as being critical because replacement of the tetra-n-butylammonium hydroxide by other quaternary ammonium hydroxides (such as tetraethyl, tetrapropyl, triethylpropyl, and triethylbutyl hydroxides) results in amorphous products. Silicalite-2 precursor is stable at extended reaction times in the hydrothermal system. The amount of Al present in silicalite-2 depends on the purity of the starting materials and is reported as being <5 ppm. The precursor contains occluded tetraalkylammonium salts which, because of their size, are removed only by thermal decomposition. Thermal analysis and mass spectrometry show that the tetraalkylammonium ion decomposes at approximately 300° C. and is lost as the tertiary amine, alkene and water. This is in contrast to the normal thermal decomposition at 200° C. of the same tetraalkylammonium salt in air.

The Nature article further reports that the major differences between the patterns of silicalite and silicalite-2 are that peaks at 9.06, 13.9, 15.5, 16.5, 20.8, 21.7, 22.1, 24.4, 26.6 and 27.0 degrees 2θ (CuK alpha radiation) in the silicalite X-ray diffraction pattern are absent from the silicalite-2 pattern. Also, peaks at 8.8, 14.8, 17.6, 23.1, 23.9 and 29.9 degrees are singlets in the silicalite-2 pattern rather than doublets as in the silicalite pattern. These differences are reported as being the same as those found between the diffraction patterns of the aluminosilicates, orthorhombic ZSM-5 and tetragonal ZSM-11. Unit cell dimensions reported as calculated on the assumption of tetragonal symmetry for silicalite-2 are a=20.04; b=20.04; c=13.38. The measured densities and refractive indices of silicalite-2 and its precursor are reported as 1.82 and 1.98 g/cc and 1.41 and 1.48 respectively.

The preparation of crystalline silicates generally involves the hydrothermal crystallization of a reaction mixture comprising water, a source of silica and an organic templating compound at a pH of 10 to 14. Representative templating moieties include quaternary cations such as $XR_4$ where X is phosphorous or nitrogen and R is an alkyl radical containing from 2 to 6 carbon atoms, e.g., tetrapropyl ammonium hydroxide or halide, as well as alkyl hydroxyalkyl compounds, organic amines and diamines, and heterocycles such as pyrrolidine.

When the organic templating compound is provided to the system in the hydroxide form in sufficient quantity to establish a basicity equivalent to the pH of 10 to 14, the reaction mixture need contain only water and a reactive form of silica as additional ingredients. In those cases in which the pH is required to be increased to above 10, ammonium hydroxide or alkali metal hydroxides can be suitably employed for that purpose, particularly the hydroxides of lithium, sodium, and potassium. It has been found that not more than 6.5 mols of alkali metal oxide per mol-ion of organic templating species are required for this purpose even if none of the templating compound is provided in the form of its hydroxide.

The source of silica in the reaction mixture can be wholly or in part alkali metal silicate but should not be employed in amounts greater than that which would change the molar ratio of alkali metal to organic templating compound set forth above. Other silica sources include solid reactive amorphous silica, e.g., fume silica, silica sols, silica gel, and organic orthosilicates. Since the nature of the reaction system is favorable for the incorporation of alumina as an impurity into the crystalline silica product, care should be exercised in selecting the silica source so as to minimize the content of alumina as an impurity. Commercially available silica sols can typically contain from 500 to 700 ppm $Al_2O_3$, whereas fume silicas can contain from 80 to 2000 ppm of $Al_2O_3$ impurity. Ethyl orthosilicate is a preferred silica source as it can be obtained with very low alumina contents. Small quantities of $Al_2O_3$ present in the crystalline silicate product do not significantly alter its essential properties. However, large amounts of alumina, such as are used in preparing the ZSM-5 zeolite of Argauer et al., yield a product which does not have the broad use in olefin producing reactions of the crystalline silicates. The quantity of silica in the reaction system should generally be from about 13 to 50 mols $SiO_2$ per mol-ion of the organic templating compound. Water should be generally present in an amount of from 150 to 700 mols per mol-ion of the organic templating compound. Water should be generally present in an amount of from 150 to 700 mol per mol-ion of the quaternary cation. The reaction preferably occurs in an aluminum-free reaction vessel which is resistant to alkali or base attack, e.g., teflon.

When alkali metal hydroxides have been used in the reaction mixture, alkali metal cations appear as impurities in the crystalline product. These impurities may be present in the crystalline mass in an amount of around 1 wt %. It is preferable to reduce the concentration of alkali metal moieties in the crystalline mass by ion exchange and other suitable removal means to less than 0.1 weight percent alkali metal, preferably less than 0.03 weight percent, and more preferably less than 0.01 weight percent alkali metal.

Suitable ion exchange materials include those which are decomposable to hydrogen by calcination and are known to the art, for example, ammonium nitrate, or those metal cation or cation complexes which exhibit little or no hydrogenative or cracking activity, such as calcium, strontium, barium, zinc, silver, or the rare earth metals. As used herein, "hydrogenation activity" refers to the capability to absorb and dissociate molecular hydrogen. The residual alkali metal in the product can also be removed by washing with an aqueous acid solution of sufficient strength, e.g., hydrochloric acid. The crystal structure is not otherwise affected by contact with strong mineral acids even at elevated temperatures due to the lack of acid-soluble constituents in its crystal structure.

The crystalline silicate may be in any convenient form that can be required for ordinary fixed bed, fluidized bed or slurry use. Preferably, it is in a fixed bed reactor and in a composite with a porous inorganic binder or matrix in such proportions that the resulting product contains from 1 to 95% by weight and preferably from 10 to 70% by weight of silicate in the final composite.

The preferred crystalline silicates are those disclosed in U.S. Pat. No. 4,061,724 and U.S. Pat. No. Re. 29,948.

The terms "matrix" and "porous matrix" include inorganic compositions with which the silicate can be combined, dispersed, or otherwise intimately admixed wherein the matrix is not catalytically active in a hydrocarbon cracking sense i.e., contains substantially no acid sites, and has substantially no hydrogenation activity. The porosity of the matrix can either be inherent in a particular material or it can be caused by a mechanical or chemical means. Representative of satisfactory matrices include pumice, firebrick, diatomaceous earth and inorganic oxides. Representative inorganic oxides include alumina, silica, naturally occurring and conventionally processed clays, for example, bentonite, kaolin, sepiolite, attepulgite, and halloysite. The preferred matrices have few, if any, acid sites and therefore have little or no cracking activity. Silica and alumina are especially preferred. The use of a non-acidic matrix is preferred to maximize olefin production.

The compositing of the crystalline silicate with an inorganic oxide matrix can be achieved by any suitable known method wherein the silicate is intimately admixed with the oxide while the latter is in a hydrous state, for example, as a hydrous salt, hydrogel, wet gelatinous precipitate, or in a dried state, or combinations thereof. A convenient method is to prepare a hydrous mono or plural oxide gel or cogel using an aqueous solution of a salt or mixture of salts, for example, aluminum sulfate and sodium silicate. To the solution is added ammonium hydroxide carbonate, or similar base, in an amount sufficient to precipitate the oxides in hydrous form. After washing the precipitate to remove most of any water soluble salt present in the precipitate, the silicate in finely divided state is thoroughly admixed with the precipitate together with added water or lubricating agent sufficient in amount to facilitate shaping of the mix as by extrusion.

Surprisingly, the yield of olefins, especially $C_2$–$C_4$ olefins, has been found to be substantial even in the presence of hydrogen at 14 atmospheres or more; however, this benefit is lessened when the matrix is itself acidic. These olefins are especially desirable and are valuable for many well known uses in the petroleum and chemical processing arts, whereas their chemically less reactive alkane counterparts are far less desirable products. The yield of olefins will vary depending upon the particular feed composition, form of the silicate and reaction conditions employed. As used herein, "substantial olefin fraction" means that the converted hydrocarbons will contain at least 10 weight percent olefins, preferably at least 20 weight percent olefins, more preferably at least 30 weight percent olefins, still more preferably at least 40 weight percent olefins, and most preferably at least 50 weight percent olefins. "Converted hydrocarbons" means that portion of the hydrocarbon product which boils below the initial boiling point of the feed.

The invention is illustrated by the following examples.

EXAMPLE 1

Silicalite was prepared by dissolving 90 grams of $(C_3H_7)_4NBr$ in 30 ml of $H_2O$ and adding the solution to 39.6 grams of fumed silica in 100 ml of $H_2O$. A solution of 4.2% of NaOH dissolved in 37 g of $H_2O$ was then added to the synthesis mix with stirring. The silicate product was obtained by crystallizing the synthesis mixture as 200° C. for 70 hours.

EXAMPLE II

A catalyst was prepared containing 25 weight percent silicalite as prepared in Example I, disposed in a silica-alumina matrix having a high alumina content. The ultimate catalyst contained 3 weight percent cobalt, 7 weight percent nickel, and 20 weight percent molybdenum, had a surface area of 200 m²/g, and had an average pore diameter of 81 Angstroms.

The catalyst was contacted with an Arabian light vacuum gas oil having the properties set forth in Table E at conditions including a temperature of 416° C., a pressure of 169 bar, a liquid hourly space velocity of 1.0, and a hydrogen to hydrocarbon volume ratio of 1780 (10,000 SCFB). An inspection of the product revealed that 44.8% by weight of the 316° C.+ feed was converted to 316° C.− product with a recovery of 87.6% by weight of $C_5+$ hydrocarbons.

TABLE E

| Arabian Light Vacuum Gas Oil | |
|---|---|
| Gravity, °API | 22.9 |
| Sulfur, wt % | 2.19 |
| N, total, ppmw | 887 |
| Pour Point °C. | 29° C. |
| ASTM D-1160 Dist. | |
| IBP/10%, °C. | 339/380 |
| 30/50%, °C. | 413/447 |
| 70/90%, °C. | 468/503 |
| EP °C. | 536 |

EXAMPLE III

An experiment was carried out to test the sensitivity of a catalyst containing a silicalite crystalline silicate to the presence of nitrogen. The test of Example II was repeated except that the feed was adjusted with 1,1,3,3-tetramethylguanidine with 1,1,3,3,-tetramethylguanidine to contain 8600 ppm nitrogen. As a result of the added nitrogen, the reaction rate constant for conversion of 316° C.+ to 316° C.− hydrocarbon declined by only 25% and the overall conversion declined by 20%. By contrast, a catalyst containing 25% ZSM-5 in the same matrix tested at the same conditions exhibited a 64% decline in the reaction rate constant in the presence of the high nitrogen content feed. Thus, while feed nitrogen does not have a significant effect on the crystalline silicate, it is still preferable to reduce the feed nitrogen level.

EXAMPLE IV

A test was conducted to compare the hydrocarbon conversion activity of silicalite, ZSM-5, and silica gel for long chain n-paraffins. Individual samples of silicalite, H-ZSM-5, and an amorphous silica were placed in containers together with measured amounts of $n-C_{36}$ and subjected to thermal gravimetric analysis. The samples were heated at 10° C./min; a plot of weight $n-C_{36}$ remaining vs. the temperature is shown in FIG. 1. As can be seen in FIG. 1, the rate of weight loss, i.e., the hydrocarbon conversion activity, for the crystalline silicate and for amorphous silica is greatest between 300°–350° C., whereas for ZSM-5 it is greatest between 200°–250° C.

EXAMPLE V

An experiment was performed to compare the catalytic activity of silicalite and ZSM-5 for dewaxing gas oil feeds. The feed of Table E was contacted with three composites: 25 weight percent silicalite disposed in a silica alumina matrix having a high alumina content, 25 weight percent H-ZSM-5 disposed in the same matrix, and the matrix alone. The reaction conditions and an analysis of the resulting products are shown in Table F:

TABLE F

| | Silicalite | H-ZSM-5 | Matrix |
|---|---|---|---|
| Reaction Conditions | | | |
| Temperature °C. | 404 | 404 | 404 |
| Pressure, Atm. | 167 | 167 | 167 |
| LHSV V/V/Hr | 1.0 | 1.0 | 1.0 |
| Total conversion, wt % feed | 36.0 | 54.2 | 43.2 |
| Total n-paraffin conversion, wt % feed | 41.5 | 78.9 | 8.9 |

| | | Product Analysis | | |
|---|---|---|---|---|
| n-Paraffin Level | Feed | Silicalite | H-ZSM-5 | Matrix |
| $n-C_{18}$ | 0.12 | 0.48 | 0.18 | 0.44 |
| $n-C_{19}$ | 0.17 | 0.42 | 0.02 | 0.52 |
| $n-C_{20}$ | 0.30 | 0.34 | 0.02 | 0.71 |
| $n-C_{21}$ | 0.47 | 0.58 | 0.07 | 0.34 |
| $n-C_{22}$ | 0.55 | 0.43 | 0.05 | 0.68 |
| $n-C_{23}$ | 0.55 | 0.38 | 0.31 | 0.58 |
| $n-C_{24}$ | 0.53 | 0.34 | 0.05 | 0.58 |
| $n-C_{25}$ | 0.51 | 0.30 | 0.12 | 0.45 |
| $n-C_{26}$ | 0.51 | 0.19 | 0.03 | 0.41 |
| $n-C_{27}$ | 0.49 | 0.11 | 0.08 | 0.25 |
| $n-C_{28}$ | 0.45 | 0.17 | 0.15 | 0.21 |
| $n-C_{29}$ | 0.43 | 0.09 | 0.24 | 0.11 |
| $n-C_{30}$ | 0.39 | 0.03 | 0.07 | 0.20 |
| $n-C_{31}$ | 0.30 | 0.00 | 0.00 | 0.15 |
| $n-C_{32}$ | 0.28 | 0.00 | 0.00 | 0.08 |
| $n-C_{33}$ | 0.28 | 0.00 | 0.00 | 0.00 |
| $n-C_{34}$ | 0.16 | 0.00 | 0.00 | 0.00 |
| $n-C_{35}$ | 0.12 | — | — | — |
| Total n-paraffins wt % of feed | 6.61 | 3.86 | 1.39 | 6.01 |

The product analyses set forth in Table F show that silicalite preferentially allows cracking of higher molecular weight n-paraffins to lower molecular weight n-paraffins, as indicated by the 68% conversion of $nC_{25}-nC_{35}$ paraffins but only an 8% reduction in $nC_{18}-nC_{24}$ paraffins. In contrast, the ZSM-5 removed 77% of $nC_{25}-nC_{35}$ paraffins and 81% of the $nC_{18}-nC_{24}$ paraffins, while the matrix alone removed 36% of the $nC_{25}-nC_{35}$ paraffins produced 19% extra $nC_{18}-nC_{24}$ paraffins. Thus, silicalite is more selective for converting high molecular weight n-paraffins into paraffins of intermediate molecular weight than either ZSM-5 or the matrix. This is a very desirable benefit for a dewaxing catalyst since the long chain waxes are preferentially cracked to shorter chained paraffins while the very active ZSM-5 tends more to crack intermediate chain paraffins to gases.

It is believed that straight-chain hydrocarbon and slightly branched-chain hydrocarbons are adsorbed within the pores of the silicalite and detained there for a time sufficient for cracking to occur. The adsorbed paraffin cracks to a lower molecular weight paraffin and olefin. It is believed paraffin is retained in the pore for further cracking, while the olefin is rejected by the hydrophobic surface of the silicate. In contrast, it is believed the olefin is retained by a ZSM-5 zeolite and is hydrogenated. The more highly branched-chain hydrocarbons and hydrocarbons of other forms, not being adsorbed by the silicate, pass the reaction zone. This theory is not intended to limit the invention.

EXAMPLE VI

A crystalline silicate composition containing 400 ppmw sodium was mixed in the proportion of one part by weight silicalite to two parts by weight alumina. The composition was tested for hydrocarbon conversion with a 391° C. (725° F.+) hydrocarbon fraction having the properties set forth in Table G:

TABLE G

| Feed | Light Neutral Lube Oil |
|---|---|
| Boiling range 10/50/90%, °C. | 391/403/432 |
| ppm N/ppm S | 1.2/6.1 |
| Pour Point °C. | > +29 |
| Viscosity Index | 112 |

Reaction conditions included a temperature of 405° C. and of 416° C. pressure of 70 bar, a LHSV of 2, and 1,780 L $H_2$/L oil (10,000 SCF/B). The resulting liquid products were analyzed as follows:

TABLE H

| Yields, wt % | Run A 405° C. | Run B 416° C. |
|---|---|---|
| $C_1$ | 0 | 0 |
| $C_2^=$ | 0.1 | 0.1 |
| $C_2$ | 0 | 1.1 |
| $C_3^=$ | 1.7 | 1.9 |
| $C_3$ | 1.1 | 1.3 |
| $C_4^=$ | 3.0 | 4.1 |
| $C_4$ | 1.4 | 1.7 |
| $C_5$-82° C. | 9.1 | 11.5 |
| 82-199° C. | 2.5 | 3.7 |
| 199-371° C. | 2.7 | 4.0 |
| 371° C.+ | 78.4 | 71.6 |
| Pour Point, °C. | +7 | −4 |
| Viscosity Index | 98 | 92 |

Thus, hydrocarbon conversion over the crystalline silicate not only increases the viscosity index and lowers the pour point substantially, but also produces a $C_4^-$ hydrocarbon product comprising a very substantial amount of olefins, about 65 weight percent.

EXAMPLE VII

An experiment was performed on the feed of Example VI, Table G, to compare performance of ZSM-5 to silicalite while processing to comparable pour points (Runs B of Example VI and VII) and to comparable yields (Runs A of Examples VI and VII). The ZSM-5 composite was prepared in an alumina matrix, at 1 part ZSM-5 to 2 parts alumina (by weight). Reaction conditions were: pressure −70 bar, LHSV-2, and 1,780 L $H_2$/L oil (10,000 SCF/B).

TABLE I

| Yields, wt % | Run A 291° C. | Run B 290° C. |
|---|---|---|
| $C_1$ | 0 | 0.1 |
| $C_2^=$ | 0 | 0 |
| $C_2$ | 0.2 | 0.1 |
| $C_3^=$ | 0 | 0 |
| $C_3$ | 3.9 | 3.0 |
| $C_4^=$ | 0.3 | 0.2 |
| $C_4$ | 6.3 | 4.9 |
| $C_5$-82° C. | 8.8 | 7.1 |
| 82-199° C. | 2.3 | 1.9 |
| 199-371° C. | 0.2 | 0.2 |
| 371° C.+ | 78.0 | 82.5 |
| Pour Point, °F. | −10 | +15 |
| Viscosity Index | 86 | 92 |

In comparing the data of Example VII with those of Example VI, it can be seen that even where there is a substantial pressure and presence of hydrogen, silicalites surprisingly produce olefins while ZSM-5 does not.

EXAMPLE VIII

A crystalline silicate composition, silicalite, containing 140 ppmw sodium was mixed with an alumina (35/65 w/w). The composition was tested for hydrocarbon conversion on 100 RON Arabian reformate having the following characteristics:

| | |
|---|---|
| Gravity, °API | 40 |
| Distillation °C. 10/50/90% | 110/138/184 |
| Paraffins/Naphthene/Aromatic (LV %) | 25/2/73 |
| n-Paraffins (LV %) | 8 |

Reaction conditions included a temperature of 482° C. (900° F.), a pressure of 400 psig (27.6 bar), LHSV of 2 and a hydrogen to hydrocarbon mol ratio of 8. The products were as follows:

| Yields, Wt % | |
|---|---|
| $C_2$ Paraffins | 0.5 |
| $C_2$ Olefins | 0.8 |
| Yields, LV % | |
| $C_3$-$C_4$ Paraffins | 2.7 |
| $C_3$-$C_4$ Olefins | 2.8 |
| $C_5+$ | 94.7 |
| $C_5$ + RON | 102.0 |

Other embodiments of the invention will be apparent to those skilled in the art after reading this specification.

What is claimed is:

1. A process for producing olefins from normal paraffins, slightly branched paraffins, and mixtures thereof, comprising contacting a feed which comprises said paraffins with silicalite, and producing an effluent of greater olefin content than said feed.

2. The process of claim 1 wherein said feed is selected from naphtha and reformate and the effluent has a higher octane rating than said feed.

3. The process of claim 1 wherein said olefin content is at least 10 weight percent of converted feed.

4. The process of claim 1 wherein said feed contains at least 5 weight percent normal and slightly branched hydrocarbons.

5. The process of claim 1 wherein said silicalite is composited in a matrix and the resulting composite contains from 1 to 95 weight percent silicate.

6. The process of claim 5 wherein said matrix is substantially free of hydrocracking activity and said composite is substantially free of hydrogenation activity.

7. The process of claim 1 wherein said feed boils above 200° C.

8. The process of claim 1 wherein said process is carried out at conditions including a temperature from 285° C. to 595° C., a pressure from subatmospheric to 205 bar, and an overall liquid hourly space velocity from 0.1 to 50 v/v/hr.

9. The process of claim 8 wherein said conditions include a hydrogen partial pressure up to 100 bar.

10. A process for producing olefins from normal paraffins, slightly branched paraffins, and mixtures thereof, comprising contacting a feed which comprises said paraffins with a composition which is substantially free of hydrogenation activity comprising silicalite composited in a matrix which is substantially free of cracking activity, said contacting occurring at temperatures from about 285° C. to 595° C., pressures from subatmospheric to 205 bar, and hydrogen to hydrocarbon volume ratios from about 350 to 3650 liters hydrogen/liter hydrocarbon; and producing an effluent of greater olefin content than said feed, wherein said olefin content is at least 10 weight percent of converted feed.

* * * * *